United States Patent [19]

Ooue et al.

[11] Patent Number: 4,472,028
[45] Date of Patent: Sep. 18, 1984

[54] ORGANOSILICONE HOMEOTROPIC ALIGNMENT LAYER WITH OH GROUP

[75] Inventors: Michio Ooue, Hitachi; Kishiro Iwasaki, Hitachiota; Hiroaki Hachino; Mitsuru Ura, both of Hitachi; Ryoichi Sudo, Yokosuka, all of Japan

[73] Assignee: Hitachi, Ltd., Tokyo, Japan

[21] Appl. No.: 308,615

[22] Filed: Oct. 5, 1981

[30] Foreign Application Priority Data

Oct. 7, 1980 [JP] Japan ................................. 55-139304

[51] Int. Cl.³ .............................................. G02F 1/133
[52] U.S. Cl. .................................................... 350/341
[58] Field of Search .................... 350/339 R, 340, 341

[56] References Cited

U.S. PATENT DOCUMENTS

| | | | |
|---|---|---|---|
| 3,973,057 | 8/1976 | Channin et al. | 350/340 X |
| 3,989,354 | 11/1976 | Dubois et al. | 350/340 |
| 4,105,298 | 8/1978 | Levine et al. | 350/340 |
| 4,381,886 | 5/1983 | Yokokura et al. | 350/340 |

FOREIGN PATENT DOCUMENTS

| | | | |
|---|---|---|---|
| 2635630 | 2/1977 | Fed. Rep. of Germany | 350/341 |
| 79414 | 6/1980 | Japan | 350/341 |
| 2026190 | 1/1980 | United Kingdom | 350/341 |

Primary Examiner—John K. Corbin
Assistant Examiner—David Lewis
Attorney, Agent, or Firm—Antonelli, Terry & Wands

[57] ABSTRACT

A liquid crystal display device comprising two substrates being provided in parallel to each other at a given distance and each having a Nesa film on the counterposed surface, at least one of the substrates being transparent, and a liquid crystal being filled between the substrates, the counterposed surfaces of the substrates each being coated with polymer of organosilicone compound having groups reacting with the substrates to a thickness of 300–1,500 Å as an alignment film. The device has thick alignment films and good electrooptical characteristics.

18 Claims, 3 Drawing Figures

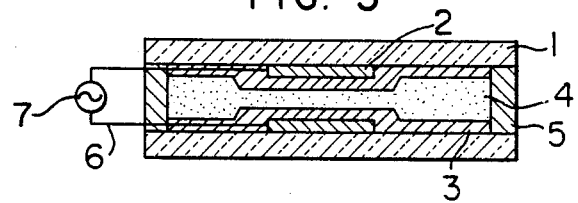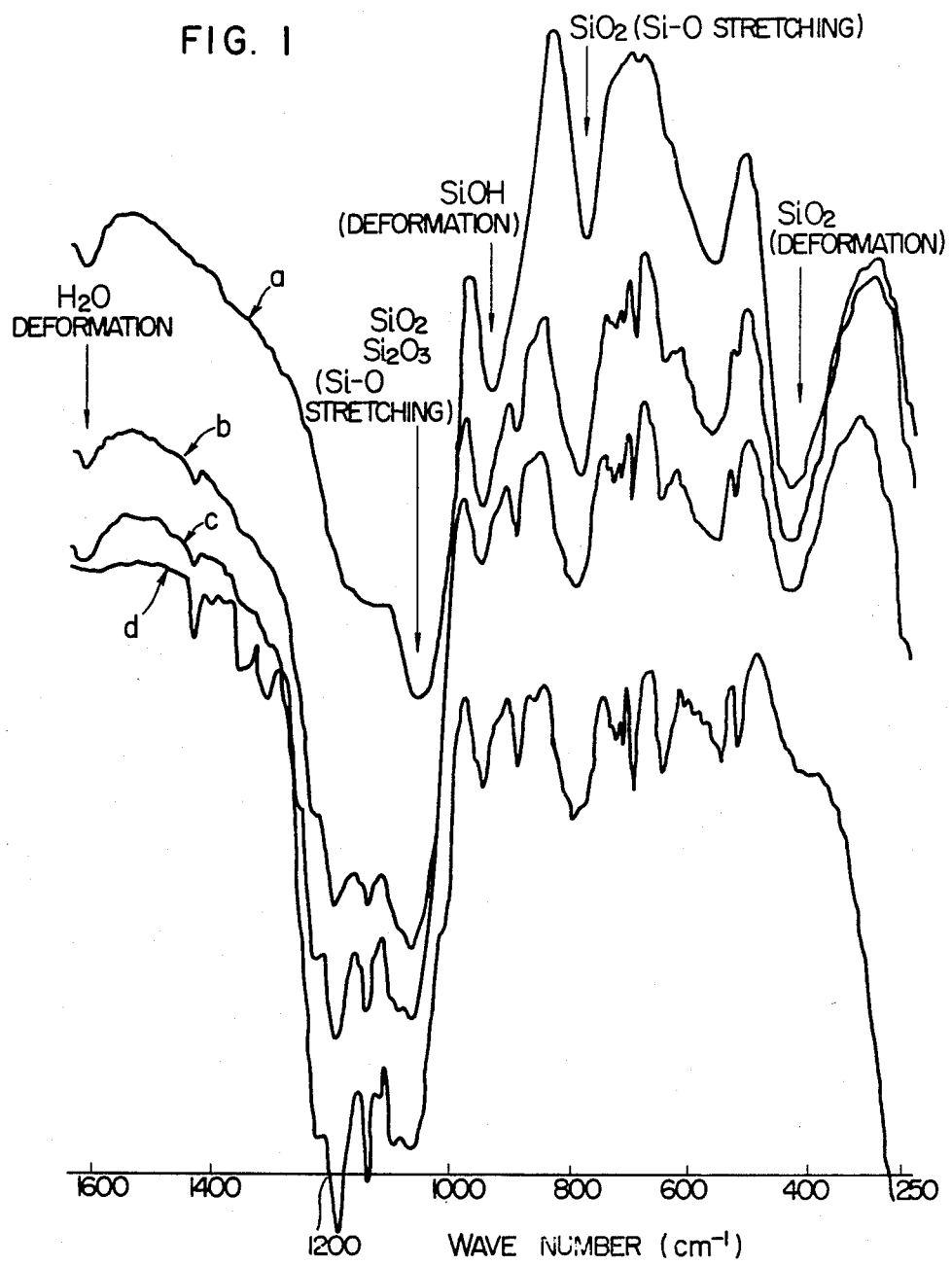

ORGANOSILICONE HOMEOTROPIC ALIGNMENT LAYER WITH OH GROUP

BACKGROUND OF THE INVENTION

This invention relates to a liquid crystal display device, and more particularly to a liquid crystal display device having a thick alignment film and good electrooptical characteristics.

Heretofore, it has been proposed to provide an alignment film on a substrate by coating the surface of a substrate with a silane coupling agent, etc. for aligning liquid crystal homeotropically to the surface of the substrate. As the silane coupling agent, there have been proposed alkyltrialkoxysilanes (Japanese Laid-open Patent Application No. 50947/75), alkyltrialkoxysilanes and tetraalkoxysilanes (Japanese Laid-open Patent Application No. 63955/75), haloalkylalkoxysilanes such as fluoroalkoxysilanes (Japanese Laid-open Patent Application Nos. 68355/75 and 36150/75).

Furthermore, there have been proposed alignment films of polysiloxane obtained by hydrolysis and condensation of fluoroalkoxysilane (Japanese Laid-open Patent Application No. 68355/75) and alignment films of polysiloxane such as silicone oil (Japanese Laid-open Patent Application No. 94693/73).

The alignment film on the substrate for a liquid crystal display device has a function as an insulation film when a "NESA" (a trademark) film (transparent electro conductive film) is provided directly under the alignment film, and thus a thin alignment film undergoes electrochemical reaction between a very small amount of impurities, particularly ionized impurities in the liquid crystal and the NESA film during the functioning of a liquid crystal display device, resulting in deterioration. Furthermore, the NESA film on the substrate plate is liable to make patterns of the NESA film visible even if not displayed, when liquid crystal is filled in the liquid crystal display device. Thus, it is necessary that the alignment film has an appropriate thickness, for example, 300–2,000 Å, also for the prevention of the patterns of NESA film from being visible when not displayed.

When the substrate for a liquid crystal display device is coated with a silane monomer such as the above-mentioned alkylsilane, etc., only a very thin alignment film, for example, a film having a thickness of less than 100 Å, is obtained. When the substrate is coated with the above-mentioned polysiloxane, and the thickness is increased, cracks develop on the alignment film with poor adhesiveness of polysiloxane to the substrate, because polysiloxane has no groups capable of contributing to condensation reaction between the substrate and polysiloxane molecules, or between polysiloxane molecules themselves when cured. Thus, the alignment films obtained by coating of silane monomers or polysiloxane have had problem in their practice.

SUMMARY OF THE INVENTION

An object of the present invention is to overcome the problems in alignment films encountered in the prior art, and provide a liquid crystal display device having a thick alignment film and good electrooptical characteristics.

Another object of the present invention is to provide a liquid crystal display device having a NESA (transparent electroconductive) film, e.g., films of tin oxide and indium oxide, directly under an alignment film, in which the pattern of the NESA film is invisible, when not displayed, even if a liquid crystal is filled in the liquid crystal display device.

Other objects of the present invention will be apparent from the disclosure which follows.

The present invention provides a liquid crystal display device which comprises two substrates being provided in parallel to each other at a given distance and each having a NESA film on the counterposed surface, at least one of the substrates being transparent, and a liquid crystal being filled between the substrates, the counterposed surfaces of the substrates each being coated with polymer of organosilicone compound having groups reacting with the substrates to a thickness of 300–1,500 Å as an alignment film.

According to the present invention, particularly the groups reacting with the substrate of the organosilicone compound is OH groups, and the organosilicone compound having groups reacting with the substrate is alkylsilanol polymer having the following general formula as repetitive units:

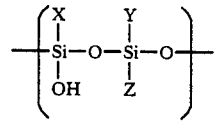

wherein X, Y and Z are OH groups, alkyl groups and haloalkyl groups, and are alkyl groups and haloalkyl groups at least at the terminals. That is, the alkylsilanol polymer according to the present invention includes alkylsilanol polymer, haloalkylsilanol polymer and haloalkylalkylsilanol polymer, and at least one of these alkylsilanol polymers is used in the present invention.

The alignment film according to the present invention is prepared by coating the counterposed surface of a substrate having a NESA film with a solution of oligomers of organosilicone compound having groups reacting with the substrate, the solution further containing a viscosity-increasing polymer, and then heating the coated substrate, thereby condensing the oligomers.

According to the present invention, the oligomers of organosilicone compound having groups reacting with the substrate includes alkylsilanol oligomer, haloalkylsilanol oligomer and haloalkylalkylsilanol oligomer having small number of the unit of the above-mentioned general formula, and the solution containing at least one of these oligomers is applied to the counterposed surface of the substrate and heated to form an alignment film for liquid crystal on the substrate. The oligomer of the organosilicone compound will be hereinafter referred to merely as "alkylsilanol oligomer".

The liquid crystal display device having such alignment films as prepared according to the present invention has a good alignment for not only nematic liquid crystal molecules, but also cholesteric liquid crystal molecules, and has good electrooptical characteristics. Particularly, reticular polymers are formed from the oligomer molecules by dehydration-condensation of silanol groups (Si—OH), and thus the alignment films are readily formed. At the same time, the silanol groups of the alkylsilanol oligomer molecules react also with hydroxyl groups (—OH) on the oxide surface of or glass substrate or NESA film of indium oxide, etc., so that the adhesiveness of the alignment film to the substrate becomes very high.

The organic groups of the alkylsilanol oligomer, which act on homeotropic alignment of liquid crystal molecules are alkyl groups and haloalkyl groups, and those having 3 to 18 carbon atoms works effectively. These groups are effective for the homeotropic alignment of liquid crystal molecules, but the density of these organic or haoorganic groups and ordered alignment of these groups in the alignment film, particularly on the surface are important at the same time. According to the present invention, the alkyl or haloalkyl groups of the alkylsilanol oligomers are chemically bonded to the oligomers, and the density of these organic groups in the oligomers can be controlled as desired by adjusting the concentration of organosilicone compounds having alkyl or haloalkyl groups when the oligomers are synthesized. It is apparent that use of such alkylsilanol oligomers can contribute to uniform distribution of the density of the organic groups over the surface of a substrate after condensation, irrespective of the surface state of the substrate to be coated, and consequently can contribute to ordered alignment of the organic groups.

The alkylsilanol oligomer undergoes gradual spontaneous condensation in the air, and thus it is usually difficult to separate the oligomers themselves from the synthesis solution for isolated use. The synthesis solution of oligomers in organic solvent as such, or after addition of other organic solvent and a viscosity-increasing polymer, is used in the present invention.

The solution of alkylsilanol oligomers according to the present invention can be prepared in the following methods.

According to a first method, an organic solvent solution containing silanol oligomers is admixed with monomers of alkylchlorosilane, alkylalkoxysilane, haloalkylchlorosilane or haloalkoxysilane for reaction. In that case, not only the monomers, but also oligomers such as dimers, trimers and tetramers can be used, but the monomers are more reactive and thus preferable.

consequently a uniform alignment film cannot be obtained therefrom.

When alkylchlorosilane or haloalkylchlorosilane is used as the silane for synthesis of alkylsilanol oligomers, the rate of reaction at the synthesis is higher, but hydrochloric acid or chlorine may be formed sometimes during the reaction. They remain in the alignment film and dissolve in liquid crystal when a liquid crystal display device is made, thereby impairing the reliability of the liquid crystal display device. In the most cases, it is preferable to use alkylalkoxysilane or haloalkoxy silane as the silane.

The alkyl or haloalkyl groups which will be the organic groups in the alkylsilanol oligomers, the organic groups acting upon the alignment of liquid crystal molecules, are those of alkylalkoxysilane, haloalkylalkoxysilane and haloalkylalkylalkoxy silane.

The raw material alkylalkoxysilane is a compound represented by the following general formula:

$$C_nH_{2n-1}-\underset{\underset{R_m}{|}}{Si}-(OR^1)_{3-m}$$

wherein R and $R^1$ are lower alkyl groups, m is 0 or 1, and m an integer of 3–18.

The haloalkylalkoxysilane is a compound represented by the following general formula:

$$C_pX_{2p+1}(CH_2)_q-\underset{\underset{R_r}{|}}{Si}-(OR^1)_{3-r}$$

wherein X is a halogen atom, R and $R^1$ lower alkyl groups, p an integer of 1–10, q 2 or 3, and r 0 or 1.

According to the first method for synthesizing alkylsilanol oligomers by reaction of silanol oligomers with alkylalkoxysilane, haloalkylalkoxysilane, or haloalk- These viscosity-increasing polymers can enhance the viscosity of the solution of alkylsilanol oligomers to improve the applicability, and can form a thick and uniform film on the substrate for a liquid crystal display device. These viscosity-increasing polymers undergo thermal decomposition by heating for curing or condensation, and thus will not give any adverse effect upon the alignment of liquid crystal molecules.

Particularly, addition of polyimide as the viscosity-increasing polymer to the solution of alkylsilanol oligomer can enhance the refractive index of the alignment film obtained by coating and curing of the solution of alkylsilanol oligomer from 1.5–1.6 to 1.7–1.8, and thus when the solution of alkylsilanol oligomer containing the polyimide is applied to a soda glass substrate (refractive index: 1.4–1.5) having an indium oxide-based NESA film (refractive index: 1.8–1.9) and cured, the patterns of the NESA film can be made invisible when not displayed. That is, the addition of the viscosity-increasing polymer can adjust the applicability of the solution of alkylsilanol oligomer, and the thickness and the refractive index of the alignment film, making the patterns of the NESA film invisible when not displayed.

The film of the solution applied onto the substrate having a NESA film on the counterposed surface is heated to 180°–450° C. for curing. In the solution of alkylsilanol oligomer, the oligomer molecules themselves have reacting groups (—OH groups) by polycondensation as silanol groups (Si—OH), which undergo polycondensation with the reacting groups of a substrate, and also undergo dehydration-condensation between themselves to form siloxane bonds (Si—O—Si). Thus, the better adhesiveness of the alignment film to the substrate can be obtained even if the thickness of the alignment film is increased.

In the case of non-haloalkyl-silanol oligomers, curing is carried out at a temperature of 180°–350° C. though dependent upon the number of carbon atoms of the alkyl group, whereas in the case of haloalkylsilanol oligomers, curing can be carried out at a temperature of 200°–450° C.

Investigation of dehydration-condensation process of non-haloalkylsilanol oligomers and haloalkylsilanol oligomers by differential thermal analysis and thermobalance analysis reveals that the dehydration-condensation process proceeds in two steps. The reaction temperature depends upon the number of silanol groups in the oligomer molecules, but the first step of dehydration-condensation process takes place at about 180°–about 350° C., and the second step at about 370°–about 450° C. The first step process is based on the condensation of silanol groups among the oligomer molecules themselves, whereby a film of alkylsiloxane polymer or haloalkylsiloxane polymer in a reticular structure is formed, and the silanol groups remaining in the reticular structure undergo dehydration-condensation in the second step. As the curing temperature, a temperature at which the first step condensation process can be completed is enough, and the temperature elevated up to the condensation process temperature of the second step is not always required. However, in non-haloalkyl-silanol oligomers having non-haloalkyl groups having 1 to 5 carbon atoms among the non-haloalkylsilanol oligomers, and haloalkylsilanol oligomers, the non-haloalkyl groups and the haloalkyl groups have a higher thermal decomposition temperature, and thus it is sometimes desirable to conduct curing at a temperature above the condensation process temperature of the second step.

The present invention will be described in detail below, referring to examples and accompanying drawings, which are not limitative of the present invention.

BRIEF DESCRIPTION OF THE DRAWINGS

FIG. 1 is an infrared absorption spectral diagram of Solutions Nos. 4, 6, 8 and 10 in Example 1.

FIG. 3 is a schematic vertical cross-sectional view of a liquid crystal display device to which the present invention is applied.

PREFERRED EMBODIMENTS OF THE INVENTION

Figure 2:
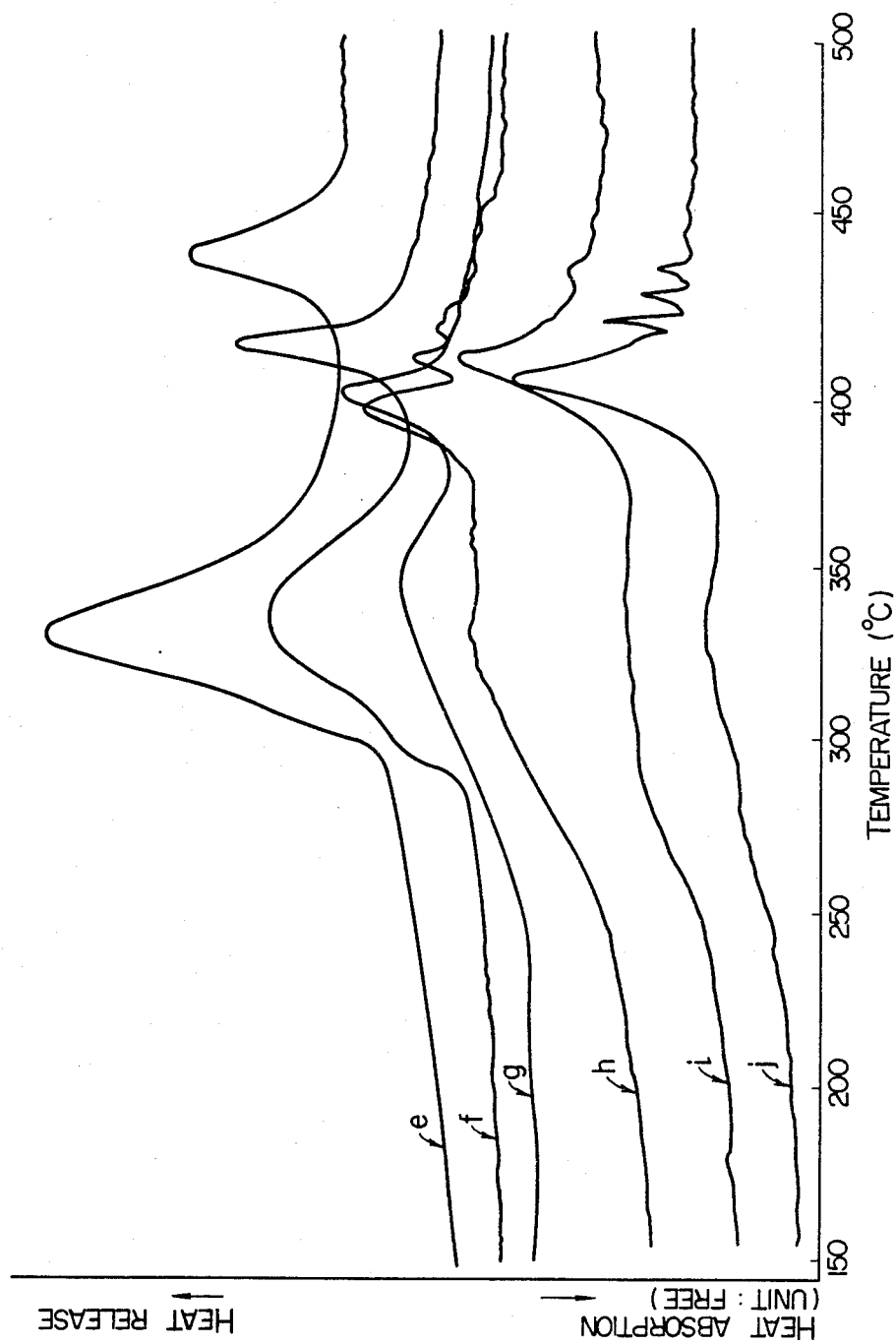
FIG. 2 is a differential thermal analytical diagram of Solutions Nos. 4, 5, 6, 8, 11 and 12 in Example 1.

Prior to conducting tests for Examples, three solutions of silanol oligomer were prepared, by synthesis and the raw materials, synthesis conditions and properties of the resulting solutions are given below as Preparatory Example.

PREPARATORY EXAMPLE

Three solutions shown in Table 1 were prepared, in the following manner.

Into a flask with a capacity of 200 ml, provided with a thermometer, a stirrer, and a cooler were charged 20.5 g of Ethyl Silicate 28 ($Si(OC_2H_5)_4$, a product of Nippon Korcoat Co., Ltd., Japan), 37.4 g of ethanol, 14.4 g of ethyl acetate, 1.5 g of acetic anhydride, and 15.0 mg of phosphorus pentaoxide at the same time. The mixture was subjected to reaction at 70° C. for 1.5 hours, and then admixed with 7 g of deionized water, and subjected to further reaction at the same temperature for 1.5 hours to prepare Solution No. 1 of silanol oligomer. Solutions Nos. 2 and 3 were prepared in the manner similar to the above. In the preparation of Solution No. 3, Ethyl Silicate 35 ($Si_2O(OC_2H_5)_8$, a product of Nippon Korcoat Co., Ltd., Japan) was used in place of Ethyl Silicate 28. Amounts of the raw materials, reaction conditions, and properties of the solutions are given in Table 1, wherein $SiO_2$ concentration is shown by involatile matters of the solution (150° C., 30 minutes). The infrared absorption spectra were determined according to KBr method after placing 2 g of the solution onto a watch glass and drying the solution at 70° C. for one hour.

TABLE 1

| | Solution No. | 1 | 2 | 3 |
|---|---|---|---|---|
| Raw material | Ethyl Silicate 28 (g) | 20.5 | 25.0 | — |
| | Ethyl Silicate 35 (g) | — | — | 25.0 |
| | Ethanol (g) | 37.4 | 38.5 | 46.0 |
| | Ethyl acetate (g) | 14.4 | 15.0 | 15.0 |
| | Acetic anhydride (g) | 1.5 | 1.5 | 1.5 |
| | Phosphorus pentaoxide (mg) | 150 | 150 | 150 |
| | Water (g) | 7 | 20 | 12.5 |
| Reaction conditions | Temperature (°C.) | 70 | 40 | 20 |
| | Time (hr) | 3 | 10 | 20 |
| Solution properties | State | Clear | Clear | Clear |
| | $SiO_2$ concentration (%) | 5.9 | 6.1 | 5.9 |
| | Absorbing substances in infrared absorption spectra | SiOH $SiO_2$ others | SiOH $SiO_2$ others | SiOH $SiO_2$ others |

As is apparent from Table 1, all the solutions are clear, and the amount of ethyl silicate residue was found to be less than 1% by weight of the initial concentration by gas chromatography, and SiOH bands and SiO2 streching and deformation bands were confirmed by infrared absorption spectra. The analytical conditions by gas chromtography in Preparatory Example and the following Example were column: 10% OV-1 (silicone oil), column temperature: 120°–170° C., injection temperature: 200° C., carrier: N2, detector: FID, and apparatus: Hitachi Gas Chromatograph type 163. The analytical conditions by infrared spectrography were apparatus: Hitachi Infrared Spectrophotometer type 260–50, scan time: 6.5 minutes, and wave number: 4000–250 cm. The alignment of liquid crystal molecules in the following Examples was determined by placing polarizing plates on the top and the bottom of the liquid crystal display device, rotating the device in such a state that the polarizing directions of the polarizing plates are crossed at a right angle to each other, and visually observing the light intensity.

EXAMPLE 1

Solution No. 1 of silanol oligomer shown in Table 1 was weighed out in the amount shown in the following Table 2, and each of the solutions was admixed with fluoroalkylalkoxysilane (a product of Shin-Etsu Chemical Co., Ltd., Japan) represented by the following formula in the amount shown in Table 2, and subjected to reaction at room temperature with stirring for 5 hours.

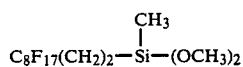

State of the resulting solutions and conversion are shown in Table 2. Conversion was determined from the amount of the silane admixed and the amount of remaining silane in the solution after the reaction by gas chromatography.

FIG. 2, heat release peak due to the dehydration-condensation of silanol was observed.

By thermobalance analysis a weight loss due to the dehydration-condensation of silanol was observed.

In the differential thermal analytical curves, heat release peak due to decomposition of fluoroalkyl group ($C_8F_{17}$—) was observed at 400° C. or higher. That is, it was confirmed that a solution of fluoroalkyl oligomers having groups $C_8H_{17}(CH_2)_2$ was formed.

Then, 2 g each of Solutions Nos. 2, 5, 6, 7, 8 and 9 in Table 2 were added separately to each solution of 0.15 g of nitrocellulose (HE-2000, a product of Asahi Chemical Industry Co., Ltd. Japan) in 20 g of ethyleneglycol monobutyl ether (butylcellosolve) in a flask provided with a stirrer, and mixed at 25° C. for one hour. The resulting solutions were all colorless and clear.

Each of the solutions thus prepared was applied onto a substrate having an indium oxide-based NESA film on the surface, and dried at 100° C. for one hour, and then at 200° C. for one hour.

A portion of the resulting film on the substrate was peeled off, and gold was vapor-deposited on the entire surface to a thickness of 500–1,000 Å. The vapor-deposited surface was traced by Talystep 1 (a product of Rank Taylor Hobson). It was found that the film thickness was 300–800 Å.

The substrates with the film of the solution of fluoroalkylsilanol oligomer on the surface including the NESA film thus formed were dried at 150° C., and then heated at 200°–450° C. for 30 minutes–2 hours. Two substrates with the films heat-treated under the above condition was disposed in parallel by Myra film having a thickness of 6–40 μm as a spacer, and sealed with an epoxy adhesive at the peripheral end, while leaving an opening for liquid crystal filling. Then, liquid crystal was filled into the space between the substrates at the opening and then the opening was sealed to prepare a liquid crystal display device.

The schematic cross-sectional view of the liquid crys-

TABLE 2

| Solution No. | 4 | 5 | 6 | 7 | 8 | 9 | 10 | 11 | 12 |
|---|---|---|---|---|---|---|---|---|---|
| Solution No. 1 of Table 1 (g) | 53.3 | 43.7 | 33.2 | 27.6 | 22.5 | 19.3 | 15.7 | 11.4 | 7.9 |
| Fluoroalkylalkoxy-silane (g) | 0.62 | 1.26 | 1.92 | 2.27 | 2.59 | 2.79 | 3.02 | 3.29 | 3.61 |
| Reaction temp. (°C.) | 25 | 25 | 25 | 25 | 25 | 25 | 25 | 25 | 25 |
| Reaction time (hr) | 10 | 10 | 10 | 10 | 10 | 10 | 10 | 10 | 10 |
| Solution state | Clear liquid | Clear liquid | Clear liquid | Clear liquid | Clear liquid | Clear liquid | Clear liquid | Phase separation | Phase separation |
| Conversion (%) | 97.4 | 97.5 | 96.7 | 96.8 | 97.4 | 97.8 | 97.5 | — | — |

As is evident from Table 2, conversion of more than 97% was attained.

After the reaction, 2 g each of the solutions was dried separately at 100° C. for one hour and subjected to infrared absorption spectrography according to KBr method. The analytical results are shown in FIG. 1, where solutions Nos. 4, 6, 8 and 11 in Table 2 are shown by infrared absorption spectral curve a, b, c and d, respectively. As is evident from FIG. 1, SiOH bands, SiO2 stretching vibration, as well as C-H stretching vibration and C-F stretching vibration were observed in all four solutions.

Differential thermal analysis had the results as shown in FIG. 2, where Solutions Nos. 4, 5, 6, 7, 8 and 11 of Table 2 are shown by differential thermal analytical curves e, f, g, h, i and j, respectively. As is evident from tal display device thus prepared is shown in FIG. 3, where 1 is glass substrates, 2 indium oxide-based NESA films as electrodes, 3 alignment films, 4 liquid crystal, 5 seals, and 6 lead wires connecting the NESA films to power source 7.

Alignment of liquid crystal in the devices thus prepared was investigated.

It was found that good alignment was attained for nematic liquid crystal in devices having the substrates with the alignment films heat-treated at 200°–450° C., irrespective of heating time, and irrespective of the position on the indium oxide-based NESA film or on the glass substrate. The tested nematic liquid crystal was liquid crystal having a positive dielectric anisotropy such as biphenyl-based liquid crystal (E-7, a product of Merck Company), phenylcyclohexane-based liquid crystal (ZLI-1083 and 2LI-1132, products of Merck Co.), and liquid crystal having a negative dielectric anisotropy such as cyclohexyl ester-based liquid crystal (EN-17 and EN-18, products of Tiso Industry Co., Ltd., Japan), etc. Good homeotropic alignment was obtained for all the tested liquid crystals.

As shown in Table 2, Solutions Nos. 11 and 12 were in phase separation into two phases. It seems that these phenomena are due to the fact that the amount of fluoroalkylsilanol oligomer having groups $C_8H_{17}—(CH_2)_2—$ exceeds the solubility in the solvent for the silanol oligomer (solvent mixture of ethyl alcohol, ethyl acetate, water and acetic acid), and consequently fluoroalkylsilanol oligomer is separated. For instance, when a solvent mixture consisting of 70% of ethyl alcohol, 2.7% of water, 4.8% of acetic acid and 22.5% of ethyl acetate was added to Solutions Nos. 11 and 12, the fluoroalkylsilanol oligomer was completely dissolved at a concentration of fluoroalkylsilanol oligomer of less than about 20%, and no two-phase separation took place.

When a solution containing fluoroalkylsilanol oligomer at a concentration of 15% by weight was admixed with a solution of 0.15 g of nitrocellulose (HE-2000, a product of Asahi Chemical Industry Co., Ltd.) in 20 g of ethyleneglycol monobutylether with stirring and the resulting solution was applied to the substrates, and cured in the same manner as above, good alignment was obtained for nematic liquid crystal.

When fluoroalkylalkoxysilane of

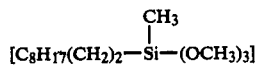

was used in place of $[C_8H_{17}(CH_2)_2—Si—(OCH_3)_2]$, substantially same results were obtained.

EXAMPLE 2

Into the same flask as used in Example 1 were weighed 50.9 g of Solution No. 2 of silanol oligomer of Table 1 and 3.52 g of fluoroalkylalkoxysilane represented by

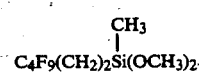

(a product of Shin-Etsu Chemical Co., Ltd., Japan). The flask was placed in a bath of iced water, and kept at about 0° C. with stirring for 30 minutes. Then, the flask was heated to 50° C., and reaction was carried out at the same temperature for two hours, whereby a clear solution was obtained.

No fluoroalkylalkoxysilane was detected in the solution by gas chromatography, and it was found that it completely reacted with silanol oligomer. 20 G of the resulting solution was admixed with a solution of 0.15 g of nitrocellulose (HE-2000, a product of Asahi Chemical Industry Co., Ltd., Japan) in 18.0 g of acetic acid diethyleneglycol monobutyl ether in a flask at 25° C. with stirring for one hour. The solution thus prepared was applied to substrates which indium oxide-based NESA films as electrodes by a spinner, and dried at 150° C. for one hour. Then, the coated substrates were heated at 300° C. for one hour. It was found in the same manner as in Example 1 that the film coated on the substrates had a thickness of 300-600 Å.

An epoxy adhesive containing 1% by weight of glass fiber pieces having a diameter of 8 μm was printed in a frame on the peripheral end of the resulting substrate, and the printed substrate was joined with a non-printed substrate in parallel to form a cell. Then, the cell was cured at 160° C. for 3 hours, and liquid crystal was filled therein in vacuum.

As the liquid crystal, cholesteric-nematic, phase-transfer type liquid crystal of biphenyl-based liquid crystal having a positive dielectric anisotropy (E-7, a product of Merck Co.) admixed with 20% by weight of 4-(2-methylbutyl)-4'-cyanobiphenyl (CB-15, an optically rotary product of Merck Co.) having the following formula:

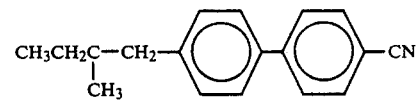

and 2.0% by weight of anthraquinone-based dichroic pigment (D-16, a product of Merck Co.) having the following formula:

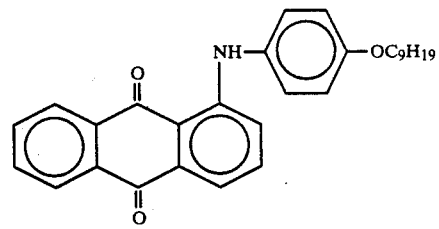

was used to utilize a guest-host effect.

The liquid crystal had a blue uniform alignment all over the entire surface of the liquid crystal display device.

When a rectangular wave with an available value of 5 Vr.m.s. was applied to the NESA film of the device, the blue color disappeared, and the contrast by on-off of the voltage was about 2.0.

When

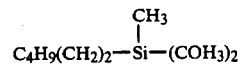

was replaced with $C_4H_9(CH_2)_2—Si—(OCH_3)_3$ (a product of Shin-Etsu Chemical Co., Ltd., Japan) to prepare a solution of fluoroalkylsilanol oligomer and also prepare a liquid crystal display device in the manner similar to the above. It was found that the device with good alignment and good contrast was obtained.

EXAMPLE 3

Into the same flask as used in Example 1 were weighed Solution No. 1 of silanol oligomer in Table 1 and fluoroalkylalkoxysilane (a product of Shin-Etsu Chemical Co., Ltd. Japan) having the following formula:

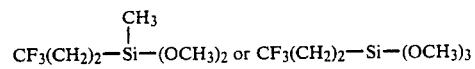

in the amount given in Table 3. The flask was placed in a bath containing iced water and kept at about 0° C. with stirring for 30 minutes. Then, the flask was heated to 70° C. and subjected to reaction at the same temperature for two hours. The state of the resulting solutions and conversion (value calculated from the amount of fluoroalkylsilane charged and that of the fluoroalkylsilane remaining after the reaction) are shown in Table 3.

TABLE 3

| Solution No. | 13 | 14 | 15 | 16 | 17 | 18 |
|---|---|---|---|---|---|---|
| Solution No. 1 of Table 1 (g) | 50.9 | 50.9 | 50.9 | 50.9 | 50.9 | 50.9 |
| $CF_3(CH_2)_2-\underset{\underset{CH_3}{\mid}}{Si}-(OCH_3)_2$ (g) | 2.08 | 1.04 | 3.12 | — | — | — |
| $CF_3(CH_2)_2-Si-(OCH_3)_3$ (g) | — | — | — | 2.18 | 1.09 | 3.27 |
| Reaction temperature (°C.) | 70 | 70 | 70 | 70 | 70 | 70 |
| Reaction time (hr) | 2 | 2 | 2 | 2 | 2 | 2 |
| Solution state | Clear | Clear | Clear | Clear | Clear | Clear |
| Conversion (%) | 99< | 98.5 | 98.0 | 99< | 98.0 | 98.5 |

As is evident from Table 3, clear solutions were obtained in all the cases, and conversion of 98% or more was attained.

2 g of Solution No. 13 in Table 3 was admixed with a solution of 0.15 g of nitrocellulose in 20 g of acetic acid diethyleneglycol monobutylether to obtain a coating solution in the same manner as in Example 2. The resulting solution was applied to the substrates with NESA films in the same manner as in Example 2, dried at 150° C. for one hour, and then heated at 400° C. for one hour. It was found in the same manner as in Example 1 that the film thus formed on the substrate had a thickness of 300-600 Å.

A printing paste of lead oxide-silicon oxide-boron oxide-based frit glass containing 0.15% by weight of glass fiber pieces having a diameter of 8 μm was screen printed in a frame on the peripheral edge of the resulting substrates, and the printed substrates were assembled to form a cell for liquid crystal display device. The cell was dried at 200° C. and heated at 410° C. for one hour under load to obtain a glass-sealed cell for liquid crystal display device.

As the liquid crystal, nematic liquid crystal having a negative dielectric anisotropy (EN-18, an ester cyclohexane-based liquid crystal of Tiso Industry Co., Ltd., Japan) admixed with 1.5% by weight of 2-methylbutyl-4-(4-hexyloxybenzoyloxy)benzoate (an optically rotatory product S-1082 of Merck Co.) having the following formula:

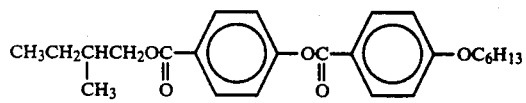

and 2.0% by weight of anthraquinone-based dichroic pigment D-16 (a product of Merck Co.) was sealed into the cell in vacuum.

The liquid crystal had a slightly bluish, substantially colorless, clear and, uniform hemotropic alignment all over the entire surface of the liquid crystal display device. When a sine wave with an available value of 3 Vr.m.s was applied to the electrodes, the liquid crystal turned blue, and the contrast by on-off of the voltage was about 2.0.

EXAMPLE 4

Into the same flask as used in Example 1 were weighed Solution No. 1 of silanol oligomer in Table 1 and various alkylalkoxysilanes in the amounts shown in Table 4. The flask was stirred at room temperature for 2 hours. State of the resulting solutions of alkylsilanol oligomer and conversion are given in Table 4.

TABLE 4

| Solution No. | 19 | 20 | 21 | 22 | 23 |
|---|---|---|---|---|---|
| Solution No. 1 in Table 1 (g) | 50.9 | 50.9 | 50.9 | 50.9 | 50.9 |
| $C_3H_7Si(OCH_3)_3$ (g) | 1.64 | — | — | — | — |
| $C_6H_{13}Si(OCH_3)_3$ (g) | — | 2.06 | — | — | — |
| $C_8H_{17}Si(OCH_3)_3$ (g) | — | — | 2.34 | — | — |
| $C_{10}H_{21}Si(OCH_3)_3$ (g) | — | — | — | 2.62 | — |
| $C_{18}H_{37}Si(OCH_3)_3$ (g) | — | — | — | — | 3.74 |
| Reaction temp. (°C.) | 70 | 70 | 70 | 70 | 70 |
| Reaction time (hr) | 2 | 2 | 2 | 2 | 2 |
| Solution time | Clear | Clear | Clear | Clear | Clear |
| Conversion (%) | 99< | 99< | 99< | 99< | 99< |

As is evident from Table 4, clear solutions were obtained in all the cases, and conversion of more than 99% was attained.

20 g of Solution No. 23 in Table 4 and 0.15 g of nitrocellulose were mixed into 18.0 g of acetic acid diethyleneglycol monobutylether to obtain a clear solution. The solution was applied onto substrates with NESA films by a spinner, dried at 100° C. for one hour, and heated at 200° C. for one hour. It was found in the same manner as in Example 1 that the film formed on the substrate had a thickness of 300-800 Å.

Cells were prepared with the resulting substrates by sealing the peripheral end of the substrates with the same epoxy adhesive as used in Example 2, and a nematic liquid crystal having a positive dielectric anisotropy, biphenyl-based liquid crystal (E-7, a product of Merck Co.) admixed with 2.0% by weight of 4-(2-methylbutyl)-4'-cyanobiphenyl (CB-15, an optically rotatory product of Merck Co.) and 2.0% by weight of anthraquinone-based dichroic pigment (D-16, a product of Merck Co.) was sealed into the cell in vacuum to obtain a guest-host effect.

The liquid had a blue, uniform alignment all over the entire surface of the liquid crystal display device, and when a rectangular wave with an available value of 5 Vr.m.s. was applied to the electrodes of the device, the blue color disappeared, and contrast by on-off of the voltage was about 2.0.

As described above, the present invention provides a liquid crystal display device having thick alignment films and good electrooptical characteristics. According to the present invention, a hemotropic alignment film can be formed on the substrate by printing or spinner coating. The present invention is applicable to a negative-positive phase transfer-type liquid crystal display device, key device in the future.

What is claimed is:

1. A liquid crystal display device which comprises two substrates being provided in parallel to each other at a given distance and each having a transparent electroconductive film on the counterposed surface, at least one of the substrates being transparent, and a liquid crystal being filled between the substrates, the counterposed surfaces of the substrates each being coated with polymer of organosilicone compound having groups reacting with the substrates, said organosilicone compound having groups reacting with the substrates being an organosilicone compound having OH groups, the polymer coating having a thickness of 300–1,500 Å, said polymer forming a homeotropic alignment film.

2. The liquid crystal display device according to claim 1, wherein the organosilicone compound having OH groups is an alkylsilanol polymer having repetitive units of the following general formula:

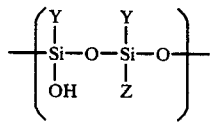

wherein X, Y and Z are OH groups, alkyl groups and haloalkyl groups, and are alkyl group and haloalkyl group at least at the terminals.

3. The liquid crystal display device according to claim 2, wherein the alkylsilanol polymer is at least one of alkylsilanol polymer, haloalkylsilanol polymer and haloalkylsilanol polymer.

4. The liquid crystal display device according to claim 1, 2, or 3, wherein the alignment film has a thickness of 500–1,000 Å.

5. A liquid crystal display device which comprises two substrates being provided in parallel to each other at a given distance and each having a transparent electroconductive film on the counterposed surface, at least one of the substrates being transparent, and a liquid crystal being filled between the substrates, the counterposed surfaces of the substrates being coated with a solution in an organic solvent of oligomer of organosilicone compound having groups reacting with the substrates and heated for condensation, said organosilicone compound having groups reacting with the substrates being an organosilicone compound having OH groups, thereby forming a homeotropic alignment film on the counterposed surface of the substrate to a thickness of 300–1,500 Å.

6. A liquid crystal display device which comprises two substrates being provided in parallel to each other at a given distance and each having a transparent electroconductive film on the counterposed surface, at least one of the substrates being transparent, and a liquid crystal being filled between the substrates, the counterposed surfaces of the substrates being coated with a solution in an organic solvent of oligomer of organosilicone compound having groups reacting with the substrates and a viscosity-increasing polymer and heated for condensation, said organosilicone compound having groups reacting with the substrates being an organosilicone compound having OH groups, thereby forming a homeotropic alignment film on the counterposed surface of the substrate to a thickness of 300–1,500 Å.

7. The liquid crystal display device according to claim 6, wherein the viscosity-increasing polymer is nitrocellulose, ethylcellulose, acetocellulose, propylcellulose, hydroxypropylcellulose, acrylic resin or polyimide.

8. A liquid crystal display device which comprises two substrates being provided in parallel to each other at a given distance and each having a transparent electroconductive film on the counterposed surface, at least one of the substrates being transparent, and a liquid crystal being filled between the substrates, the counterposed surfaces of the substrates being coated with a solution in an organic solvent of oligomer of organosilicone compound having groups reacting with the substrates and a refractive index-improving and viscosity-increasing polymer and heated for condensation, said organosilicone compound having groups reacting with the substrates being an organosilicone compound having OH groups, thereby forming a homeotropic alignment film, with a refractive index approaching that of the transparent electroconductive film on the counterposed surface of the substrate, to a thickness of 300–1,500 Å.

9. The liquid crystal display device according to claim 5, 6, 7 or 8, wherein the oligomer of organosilicone compound having groups reacting with the substrate is at least one of alkylsilanol oligomer, haloalkylsilanol oligomer, and haloalkylalkylsilanol oligomer.

10. The liquid crystal display device according to claim 5, 6, 7, or 8, wherein the alignment film has a thickness of 500–1,000 Å.

11. The liquid crystal display device according to claim 9, wherein the alignment film has a thickness of 500–1,000 Å.

12. The liquid crystal display device according to claim 9, wherein the alkyl and haloalkyl groups of the alkylsilanol oligomer, haloalkylsilanol oligomer and haloalkylalkylsilanol oligomer have 3–18 carbon atoms.

13. The liquid display device according to claim 8, wherein said refractive index-improving and viscosity-increasing polymer is polyimide.

14. The liquid crystal display device according to claim 13, wherein said oligomer is an alkylsilanol oligomer.

15. The liquid crystal display device according to claim 1, 5, 6, 8 or 14, wherein said transparent electroconductive film is made of a material including indium oxide.

16. The liquid crystal display device according to claim 15, wherein said transparent electroconductive film is an indium oxide-tin oxide film.

17. The liquid crystal display device according to claim 5, 6 or 8, wherein said solution has a pH of 7 or less.

18. The liquid crystal display device according to claim 5, 6 or 8, wherein the heating for condensation is performed at 180°–450° C.

* * * * *